United States Patent [19]
Suzuki et al.

[11] 3,966,987
[45] June 29, 1976

[54] ELECTROCONDUCTIVE HIGH POLYMER COMPOSITION

[75] Inventors: Tetsuo Suzuki; Katsuhiro Mizoguchi; Fumio Togo, all of Tokyo, Japan

[73] Assignee: Nippon Electric Company, Limited, Tokyo, Japan

[22] Filed: Apr. 8, 1975

[21] Appl. No.: 566,613

[30] Foreign Application Priority Data
Apr. 17, 1974 Japan................................ 49-43554

[52] U.S. Cl................................ 252/500; 260/42; 260/279 R
[51] Int. Cl.$^2$................................ H01B 1/06
[58] Field of Search................ 252/500; 260/279 R, 260/42

[56] References Cited
UNITED STATES PATENTS
3,346,444  10/1967  Lupinski et al................. 252/500 X
3,424,698  1/1969  Lupinski et al..................... 252/500

Primary Examiner—Benjamin R. Padgett
Assistant Examiner—E. Suzanne Parr
Attorney, Agent, or Firm—Hopgood, Calimafde, Kalil, Blaustein & Lieberman

[57] ABSTRACT

A high polymer composition consisting essentially of a nitrogen-containing organic high polymer, such as polyvinylpyridine, polyvinylquinoline, polyacrylonitrile, or polyvinylcarbazole, and 20–90% by weight of a 7,7,8,8-tetracyanoquinodimethane complex salt of N-methylacridinium. The composition has an electric conductivity of $10^{-2}$ mho/cm or more and is useful, among others, as a semiconductor layer of a solid electrolytic capacitor.

4 Claims, 11 Drawing Figures

ELECTROCONDUCTIVE HIGH POLYMER COMPOSITION

BACKGROUND OF THE INVENTION

This invention relates to an electroconductive high polymer composition which is effective, in particular, for use as an electroconductive layers of a film integrated circuit and a semiconductor layer of a solid electrolytic capacitor.

On manufacturing a conventional solid electrolytic capacitor having a manganese dioxide layer as the semiconductor layer, it has often been experienced that an oxide film of the cathode is damaged when manganese nitrate is subjected to thermal decomposition to form the manganese dioxide layer. The cathode must therefore be anodized several times. This not only is troublesome but also reduces the withstand voltage of the capacitor. In order to obviate the defects, various electroconductive high polymer compositions have trially been used to form the semiconductor layer. Compositions disclosed in Japanese Pat. No. 590,968 Pat. No. 44-15,870)which corresponds to U.S. Pat. No. 3,346,444 however, may not be used in practice because the maximum electric conductivity achieved thereby is only about $10^{-3}$ mho/cm to provide a large dielectric loss. Although compositions revealed in Japanese Pat. No. 596,586 (Pat. No. 44-16,499) which corresponds to U.S. Pat. No. 3,424,698 have higher electric conductivity, they may neither be used in practice because the layers made thereof do not well adhere to the cathode oxide films to reduce the electrostatic capacities of the capacitors and because these compositions are defective in thermal and secular stability to deteriorate the reliability of the capacitors.

SUMMARY OF THE INVENTION

It is therefore an object of the present invention to provide an electroconductive high polymer composition which has a high electric conductivity, is stable, and is capable of readily adhering to glass and to oxide substrates and films.

It is another object of this invention to provide an electroconductive high polymer composition of the type described, which is highly uniform.

It is still another object of this invention to provide an electroconductive high polymer composition of the type described, capable of admirably adhering to oxide films of solid electrolytic capacitors.

It is yet another object of this invention to provide an electroconductive high polymer composition capable of providing excellent solid electrolytic capacitors.

According to this invention there is provided an electroconductive high polymer composition which consists essentially of a nitrogen-containing organic high polymer, such as polyvinylpyridine, polyvinylquinoline, polyacrylonitrile, or polyvinylcarbazole, and 20–90% by weight of a 7,7,8,8-tetracyanoquinodimethane complex salt of N-methylacridinium and has an electric conductivity of $10^{-2}$ mho/cm or more. The percentage by weight of the nitrogen-containing organic high polymer is therefore from 80 to 10. For brevity, 7,7,8,8-tetracyanoquinodimethane will hereafter be called TCNQ.

DESCRIPTION OF THE PREFERRED EMBODIMENTS

Figure 1:
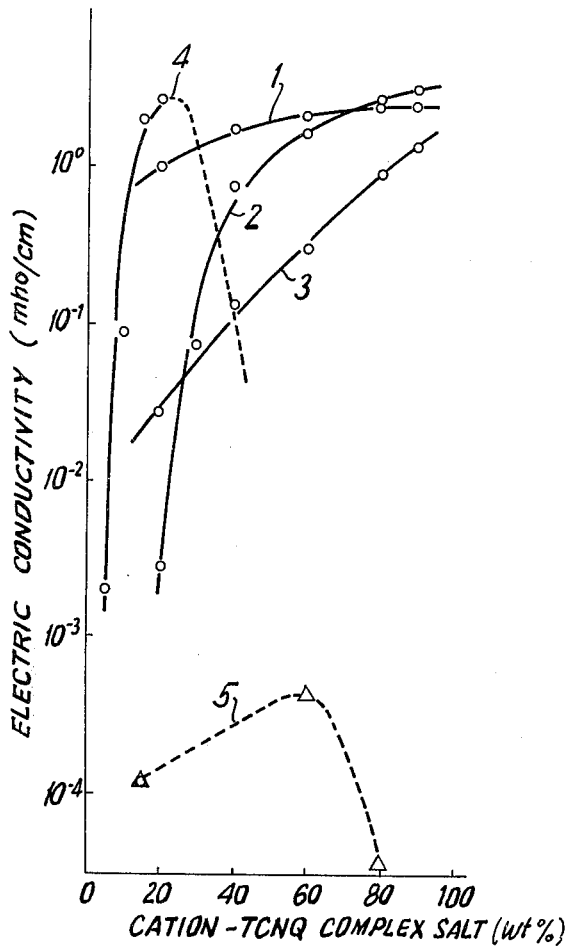
FIG. 1 shows electric conductivities of several electroconductive high polymer compositions according to the present invention and of a few like conventional compositions, versus the percentage by weight of the constituent cation-TCNQ complex salts.

For practical applications, it has now been determined that electroconductive high polymer compositions should have (1) an electric conductivity of $10^{-2}$ mho/cm or more, (2) admirable adhesiveness to glass and to oxide substrates and films, (3) capability of forming uniform films, and (4) excellent secular stability of insuring the reliability of electronic parts, such as film integrated circuits and solid electrolytic capacitors, in which the compositions are used. Among others, the semiconductor material of solid electrolytic capacitors must fulfil all of these four requirements or requisites. The preferred embodiments of the present invention will therefore be described hereunder as applied to formation of the semiconductor layers of solid electrolytic capacitors.

Insofar as applicants have tested, best possible electroconductive high polymer compositions hitherto known do not provide solid electrolytic capacitors having appreciable electrostatic capacity, secular stability, and sufficient reliability. This fact is due obviously to the semiconductor materials used. More particularly, conventional electroconductive high polymer compositions do not meet the four requirements except that relating to the electric conductivity. In contrast, applicants have confirmed that the compositions according to this invention remarkably fulfil the four requisites. Besides the sufficiently high electric conductivity, applicants' compositions show admirable adhesiveness to the cathode oxide films and excellent uniformity of the layers and are stable even left in air for 1000 hours or more. It has been proved that the solid electrolytic capacitors having semiconductor layers made of these compositions have excellent initial characteristics and remarkable reliability for sufficiently long period of time.

The reasons why applicants' composition shows such salient features would reside in the structure of the TCNQ complex salt of N-methylacridinium and the interaction, such as the compatibility, of the complex salt with the nitrogen-containing organic high polymer. It has been found through applicants' experiments that TCNQ complex salts of quaternary ammonium compounds, such as N-methylquinolinium, are remarkably stable as compared with TCNQ complex salts of quaternary ammonium compounds, such as quinolinium. The electric conductivity of the TCNQ complex salt of N-methylquinolinium, however, is reduced by the N-methyl group. Applicants have now succeeded in achieving sufficiently electroconductive and highly stable high polymer compositions by adopting as the cationic structure a structure wherein an aromatic ring is added to the N-methylquinolinium, namely, TCNQ complex salt of N-methylacridinium, and by combining in appropriate amounts the complex salt with high polymers. In addition, applicants have found that the complex salt has specific interaction with nitrogen-containing organic high polymer to show excellent compatibility with the latter so that the high polymer compositions can provide films excellent both in uniformity and adhesiveness even when the content of the complex salt amounts to 90% by weight. The stability of the compositions grows higher with an increase in the complex salt content. Incidentally, it has been confirmed that high polymer compositions consisting essentially of 20-90% by weight of TCNQ complex salt of N-methylacridinium and polyvinylpyridine, polyvinylquinoline, polyacrylonitrile, or polyvinylcarbazole are particularly excellent in electric conductivity, uniformity, adhesiveness, and stability and very useful in forming semiconductor layers of solid electrolytic capacitors.

TCNQ complex salt of N-methylacridinium was prepared as follows:

At first, 8.67 g of N-methylacridinium iodide was completely dissolved in 600 ml of acetonitrile at the boiling point and subjected to reaction with 7.35 g of TCNQ dissolved in 400 ml of acetonitrile, in nitrogen atmosphere, under violent agitation at the boiling point, for one hour. The acetonitrile used during preparation of the complex salt was thoroughly desiccated with phosphorus pentoxide and thereafter purified by distillation. Black acicular TCNQ complex salt of N-methylacridinium precipitated with the progress of the reaction. After completion of the reaction, the reaction system was slowly cooled to room temperature. The precipitate separated through filtration was thoroughly washed with acetonitrile and thereafter dried in vacuum. The TCNQ complex salt of N-methylacridinium thus prepared weighed 9.5 g. The yield was 88%.

TCNQ complex salt of N-methylacridinium and poly-4-vinylpyridine were thoroughly dissolved in various proportions in N,N-dimethylformamide (hereafter called DMF). The solution was caused to flow and extend over glass substrates and thereafter subjected to evaporation to dryness under reduced pressure to provide first samples in a film form.

TCNQ complex salt of N-methylacridinium and polyacrylonitrile were thoroughly dissolved in DMF in various proportions. The solution was similarly spread over glass substrates and evaporated to dryness under reduced pressure to provide second samples in a film form.

TCNQ complex salt of N-methylacridinium and poly-N-vinylcarbazole were thoroughly dissolved in DMF in various proportions. The solution was again spread over glass substrates and evaporated to dryness under reduced pressure to provide third samples in a film shape.

The first through third samples were compared with compositions described as examples in the above-cited Japanese Pat. No. 596,586 in electric conductivity, stability, uniformity, and adhesiveness. The results will be described in the following with reference to the accompanying drawing.

In FIG. 1, the abscissa represents the percentage by weight of the cation-TCNQ complex salts and the ordinate, the electric conductivities in mho/cm. Curves 1, 2, and 3 show the data obtained by the use of first, second, and third samples. For references, other curves 4 and 5 show the data for compositions consisting of TCNQ complex salt of quinolinium, on the one hand, and polyacrylonitrile and poly-4-vinylpyridine, on the other hand, as described in Examples 2 and 6, respectively, of the referenced Japanese Pat. No. 596,586, the dashed line curves representing additional data obtained by applicants. The electric conductivity was measured by the use of d.c. two-terminal method.

Obviously from FIG. 1, the first through third samples exhibit sufficient electric conductivity when the percentage by weight of the cation-TCNQ complex salt is 20% or more. Among others, the first samples show excellent electric conductivity. Among the references, the composition described in Example 2 (curve 4) showed considerable electric conductivity when the percentage by weight of the cation-TCNQ complex salt, here TCNQ complex salt of quinolinium, was nearly 20%. The last-mentioned composition, however, could not provide uniform films when the percentage in question was above 20% to result in sudden decrease in the electric conductivity. The composition described in Example 6 (curve 5) was very unstable to undergo deterioration during preparation and showed poor electric conductivity at any percentage of the cation-TCNQ salt.

Figure 2:
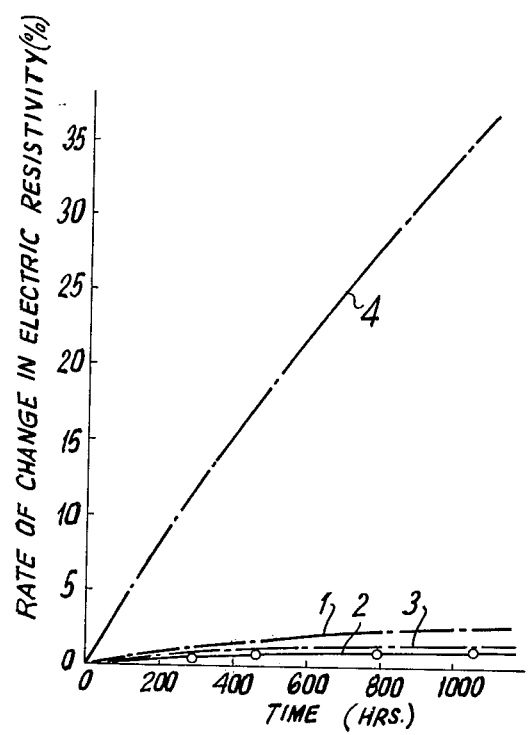
FIG. 2 shows the rates of change in electric resistivity for the compositions according to this invention and the conventional compositions.

Referring to FIG. 2, the first through third samples and the composition described in the above-mentioned Example 2 were left in air to determine the secular changes in the electric resistivity. In FIG. 2, the abscissa represents time in hours and the ordinate, the rates in percentage of change in the electric resistivity, namely, the quotients calculated by dividing the changes in the time given by the abscissa by the initial electric resistivities. Curves 1 through 3 show the data for the first through third samples wherein the percentage by weight of the TCNQ complex salt is 80%. Another curve 4 is for a composition consisting, in accordance with the above-referenced Example 2, of polyacrylonitrile and 20% by weight of TCNQ complex salt of quinolinium. FIG. 2 clearly shows that the rates of change in the electric resistivity in 1,000 hours are below 3% for the compositions according to this invention while that for the referenced composition amounts to 35%.

Figure 3:
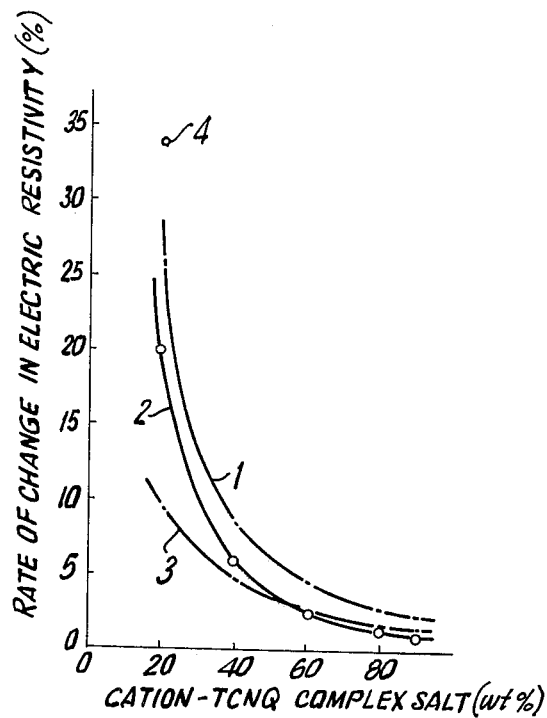
FIG. 3 shows the rates of change in electric resistivity of the compositions according to this invention and of the conventional compositions, versus the percentage by weight of the constituent cation-TCNQ complex salts.

FIG. 3 shows the rates of change in the electric resistivity of the compositions under consideration left in air for 1,000 hours as the function of the percentage by weight of the constituent cation-TCNQ complex salts. The abscissa represents the percentage. The ordinate represents the rates. Curves 1 through 4 are for the first through third samples and for the composition described in the referenced Example 2. For the compositions according to this invention, an increase in the percentage by weight raises the secular stability. As described, it was impossible with the referenced composition to observe the stability with the percentage by weight raised above 20%.

Figure 4:
FIGS. 4 through 9 are photographs, each showing a film of a composition according to this invention.
Figure 5:

FIGS. 4 and 5 are photographs of the surfaces of the first samples wherein the TCNQ complex salt contents are 80 and 90% by weight, respectively. The films are excellently uniform and have no crystal deposits.

Figure 6:
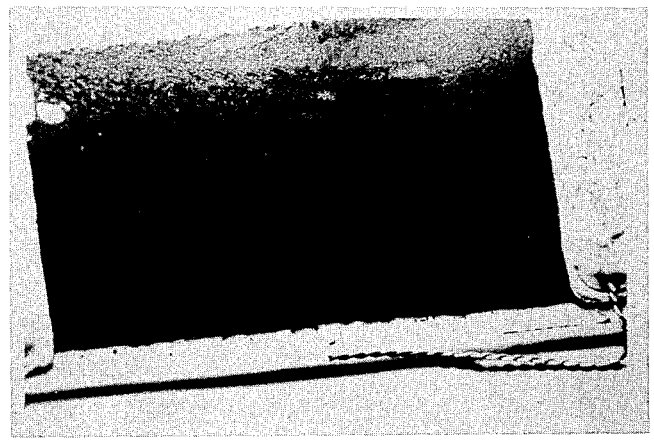
Figure 7:
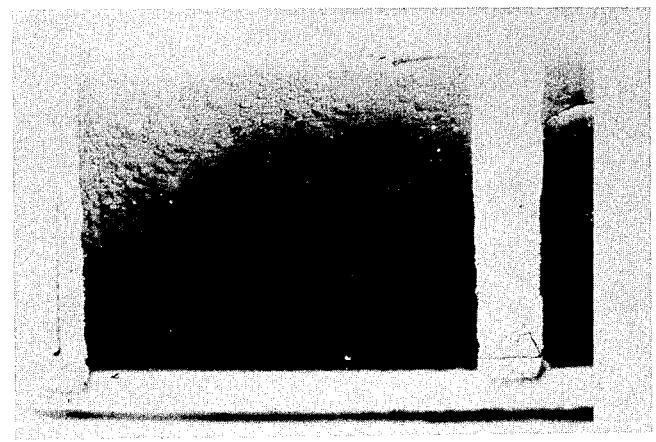

FIGS. 6 and 7 are photographs of the surfaces of the second samples wherein the TCNQ complex salt contents are 80 and 90% by weight, respectively. The films are excellently uniform and have no crystal deposits.

Figure 8:
Figure 9:
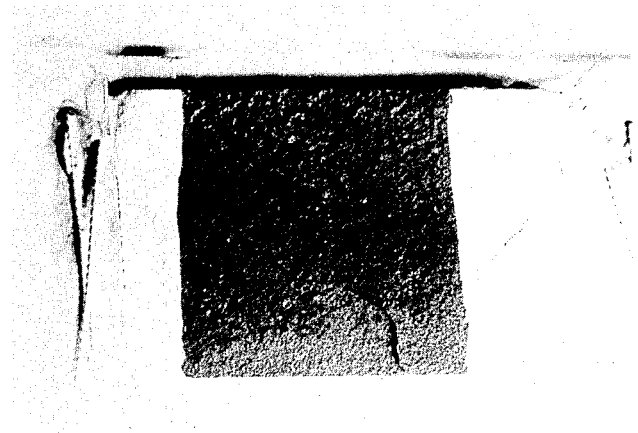

FIGS. 8 and 9 are photographs of the surfaces of the third samples wherein the TCNQ complex salt contents are 80 and 90% by weight, respectively. The film shown in FIG. 8 shows excellent uniformity. With an increase in the TCNQ content to 90% by weight, a few crystals begin to deposit as illustrated in FIG. 9. The crystal deposit of this amount, however, matters little in some practical applications.

Figure 10:
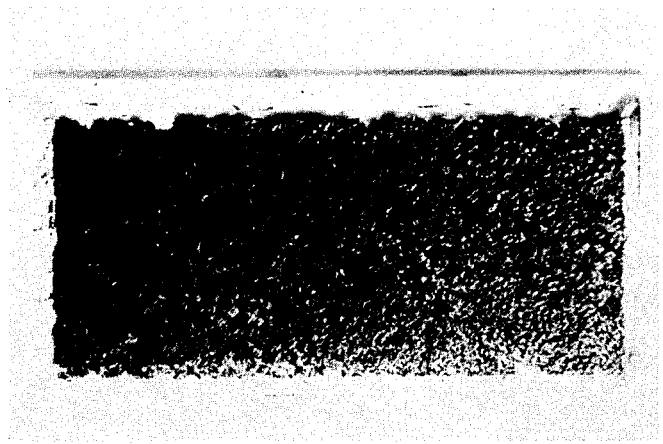
FIGS. 10 and 11 are photographs, each showing a film of a similar conventional composition.
Figure 11:
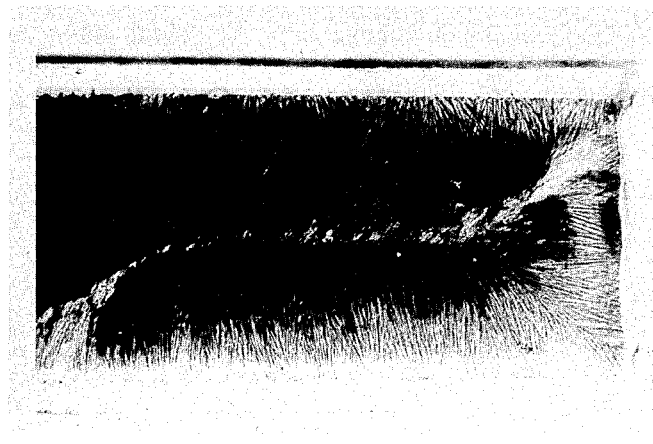

FIGS. 10 and 11 are photographs of film surfaces of compositions consisting, in accordance with the referenced Example 2, of polyacrylonitrile and 20 and 90% by weight of TCNQ complex salt of quinolinium, respectively. Crystal deposit is seen even in FIG. 10. In FIG. 11, acicular crystals of the quinolinium-TCNQ complex salt are conspicuous.

In the next place, adhesiveness of several compositions according to this invention was compared with that of similar conventional compositions by actually manufacturing tantalum plate capacitors and measuring their electrostatic capacities. The compositions used were prepared like the first and second samples mentioned above and in accordance with Example 2 of the referenced Japanese Pat. No. 596,586 and are referred to as samples A, B, and C in the following. The anodization of the tantalum plates was carried out in aqueous solution of phosphoric acid with 100 volts. The semiconductor layers were formed by dissolving the respective compositions in DMF and spreading the solutions over the oxide film of the tantalum plates with subsequent drying. The connection to the electrodes was provided with silver paste. The results of comparison are given in Table 1 wherein $C_1$ represents the electrostatic capacities actually measured. Meanwhile, theoretical electrostatic capacities were calculated by the use of the area and thickness of the tantalum oxide films and the dielectric constant of tantalum oxide. If the semiconductor layer is in close contact with the entire surface of the tantalum oxide film, the measured value $C_1$ must be equal to the theoretical value $C_2$. As will be seen from Table 1, the ratios $C_1/C_2$ are 98.2 and 83.7% for the samples A and B while the ratio $C_1/C_2$ for the sample C is only 32.5%, which value shows that the conventional composition can hardly be used in manufacturing solid electrolytic capacitors in practice.

Table 1

|  | A | B | C |
|---|---|---|---|
| $C_1$ ($\mu F$) | 0.154 | 0.125 | 0.0494 |
| $C_2$ ($\mu F$) | 0.157 | 0.149 | 0.152 |
| $C_1/C_2$ (%) | 98.2 | 83.7 | 32.5 |

With sintered-tantalum solid electrolytic capacitors anodized at 100 volts, the electrostatic capacities, dielectric losses, withstand voltages, leakage currents at 25 and 100 volts, and backward withstand voltages were measured. The semiconductor layers were made of (1) manganese dioxide, (2) a conventional composition consisting of polyacrylonitrile and 20% by weight of TCNQ complex salt of quinolinium as described hereinabove, (3) a composition consisting of poly-4-vinylpyridine and 85% by weight of TCNQ complex salt of N-methylacridinium in accordance with this invention, (4) a composition similarly consisting of poly-2-vinylpyridine and 85% by weight of TCNQ complex salt of N-methylacridinium, (5) a composition similarly consisting of polyacrylonitrile and 85% by weight of TCNQ complex salt of N-methylacridinium, (6) a composition similarly consisting of poly-N-vinylcarbazole and 85% by weight of TCNQ complex salt of N-metylacridinium, and (7) a composition likewise consisting of poly-2-vinylquinoline and 85% by weight of TCNQ complex salt of N-methylacrydinium. The results are shown in Table 2 for each of the compositions (1) through (7).

Table 2

|  | electrostatic capacity ($\mu F$ at 120 Hz) | dielectric loss ($\mu F\Omega$ at 120 Hz) | withstand voltage (V) | leakage current ($\mu A$) at 25 V | leakage current ($\mu A$) at 100 V | backward withstand voltage (V) |
|---|---|---|---|---|---|---|
| (1) | 15 | 30 | 30 | $5 \times 10^{-2}$ | short | 7.5 |
| (2) | 8.3 | 85 | 100 | $1 \times 10^{-4}$ | $1 \times 10^{-3}$ | 38 |
| (3) | 15 | 18 | 100≦ | $1 \times 10^{-4}$ | $9 \times 10^{-3}$ | 40 |
| (4) | 15 | 20 | 100≦ | $14 \times 10^{-5}$ | $17 \times 10^{-4}$ | 37.5 |
| (5) | 13 | 25 | 100≦ | $21 \times 10^{-5}$ | $87 \times 10^{-4}$ | 35 |
| (6) | 14 | 20 | 100≦ | $17 \times 10^{-5}$ | $46 \times 10^{-4}$ | 40 |
| (7) | 15 | 23 | 100≦ | $23 \times 10^{-5}$ | $28 \times 10^{-4}$ | 37 |

When manganese dioxide is used as shown at (1) of Table 2, both the electrostatic capacity and dielectric loss are excellent. The withstand voltages and leakage current, however, are very poor. As has already been mentioned to in the preamble of the instant specification, repeated anodization reduces the withstand voltage and in addition results in an increase in the leakage current because the anodizing voltage used therefor must be from 40 to 50% of the initial anodizing voltage in order to obviate breakdown of the oxide film. With the conventional composition shown at (2), deposition of crystals of the quinolinium-TCNQ complex salt is inevitable on the oxide film surface. This prevents formation of the semiconductor layer in the sintered body of tantalum to reduce the electrostatic capacity and adversely affect the dielectric loss. As shown at (3) through (7), the compositions according to this invention are capable of providing solid electrolytic capacitors whose electrostatic capacity is comparable to that achieved by the use of manganese dioxide and whose dielectric loss is even smaller. Repeated anodization is no more necessary. In addition, the withstand voltages and leakage currents are not inferior to those attained with the conventional composition given at (2).

What is claimed is:

1. A high polymer composition which consists essentially of a polymer selected from the group consisting of polyvinylpyridine, polyvinylquinoline, polyacrylonitrile and polyvinylcarbazole and 20 – 90% by weight of a 7,7,8,8-tetracyanoquinodimethane complex salt of N-methylacridinium and has an electric conductivity of at least $10^{-2}$ mho/cm.

2. A high polymer composition as claimed in Claim 1, wherein said polyvinylpyridine is poly-4-vinylpyridine or poly-2-vinylpyridine.

3. A high polymer composition as claimed in claim 1, wherein said polyvinylquinoline is poly-2-vinylquinoline.

4. A high polymer composition as claimed in claim 1, wherein said polyvinylcarbazole is poly-N-vinylcarbazole.

* * * * *